(12) United States Patent
Quella

(10) Patent No.: US 7,971,943 B2
(45) Date of Patent: Jul. 5, 2011

(54) FOOD DISPLAY WITH SHELVING SYSTEM

(75) Inventor: John F. Quella, Sturgeon Bay, WI (US)

(73) Assignee: Hatco Corporation, Milwaukee, WI (US)

( * ) Notice: Subject to any disclaimer, the term of this patent is extended or adjusted under 35 U.S.C. 154(b) by 652 days.

(21) Appl. No.: 11/939,926

(22) Filed: Nov. 14, 2007

(65) Prior Publication Data

US 2009/0121597 A1    May 14, 2009

(51) Int. Cl.
*A47F 3/06* (2006.01)
(52) U.S. Cl. .... 312/128; 312/351; 108/107; 108/147.17
(58) Field of Classification Search .................. 312/351, 312/128, 126; 108/106, 107, 109, 147.12, 108/147.17; 211/187, 150, 153, 190, 203, 211/90.01–90.04, 207
See application file for complete search history.

(56) References Cited

U.S. PATENT DOCUMENTS

| | | | | |
|---|---|---|---|---|
| 2,813,768 A * | 11/1957 | Renn | ............................. | 312/236 |
| 3,316,044 A * | 4/1967 | Carbary | ........................ | 312/408 |
| 3,999,475 A * | 12/1976 | Roderick | ........................ | 99/474 |
| 4,027,727 A * | 6/1977 | Pullens | ........................ | 165/48.1 |
| 4,212,392 A * | 7/1980 | McKenzie | .................... | 206/571 |
| 4,531,646 A * | 7/1985 | Howard | ........................ | 211/150 |
| 5,464,279 A * | 11/1995 | Wells et al. | .................... | 312/128 |
| 5,553,934 A * | 9/1996 | Wells et al. | .................... | 312/128 |
| 5,913,433 A | 6/1999 | Belokin et al. | | |
| 5,971,175 A * | 10/1999 | Bustos | ........................ | 211/187 |
| 6,098,529 A * | 8/2000 | Brummett et al. | ............. | 99/467 |
| 6,257,010 B1 * | 7/2001 | Shei et al. | ........................ | 62/252 |
| 6,318,569 B1 * | 11/2001 | Rothing | .................... | 211/90.01 |
| 6,484,891 B2 | 11/2002 | Burke | | |
| 6,497,326 B1 | 12/2002 | Osawa | | |
| 6,561,365 B2 | 5/2003 | Bustos | | |
| 6,712,229 B2 * | 3/2004 | Fritsche et al. | ............... | 211/189 |
| 6,834,768 B2 * | 12/2004 | Jersey et al. | .................. | 211/189 |
| 6,971,529 B1 | 12/2005 | Shapiro | | |
| 7,147,293 B2 | 12/2006 | Bienick et al. | | |
| 7,533,948 B2 * | 5/2009 | Smith et al. | .................... | 312/408 |
| 2003/0038100 A1 * | 2/2003 | Liu | ............................. | 211/88.01 |
| 2004/0211741 A1 * | 10/2004 | Bustos et al. | ................. | 211/187 |
| 2006/0049726 A1 * | 3/2006 | Hayase et al. | ................ | 312/128 |
| 2007/0029905 A1 | 2/2007 | Shapiro et al. | | |
| 2007/0079735 A1 * | 4/2007 | Bobis et al. | .................... | 108/102 |

* cited by examiner

*Primary Examiner* — Janet M Wilkens
*Assistant Examiner* — Dan Rohrhoff
(74) *Attorney, Agent, or Firm* — Michael Best & Friedrich LLP

(57) ABSTRACT

A food storage device for storing a food product, a shelf positioned at least partially within the housing, and a coupling assembly coupling the shelf to the housing and adjustable (e.g., infinitely) to position the shelf in one of a plurality of different angles relative to the housing. Preferably, the housing comprises a frame creating a surface coupled to the coupling assembly, and a translucent panel coupled to the frame to facilitate viewing food product positioned in the housing. In one embodiment, the coupling assembly comprises a magnetic assembly including a magnet secured to the shelf and magnetically coupled to the housing. Preferably, the magnetic assembly further comprises a magnet holder secured to the shelf, wherein the magnet is secured to the holder. In this embodiment, the magnet can be secured to the magnet holder by an intermediate material (e.g., plastic) positioned between the magnet and the magnet holder. The coupling assembly preferably includes a bracket that is positioned in an opening in the shelf. For example, the bracket can include an upper protrusion that engages an upper surface of the shelf and a lower protrusion that engages a lower surface of the shelf.

8 Claims, 7 Drawing Sheets

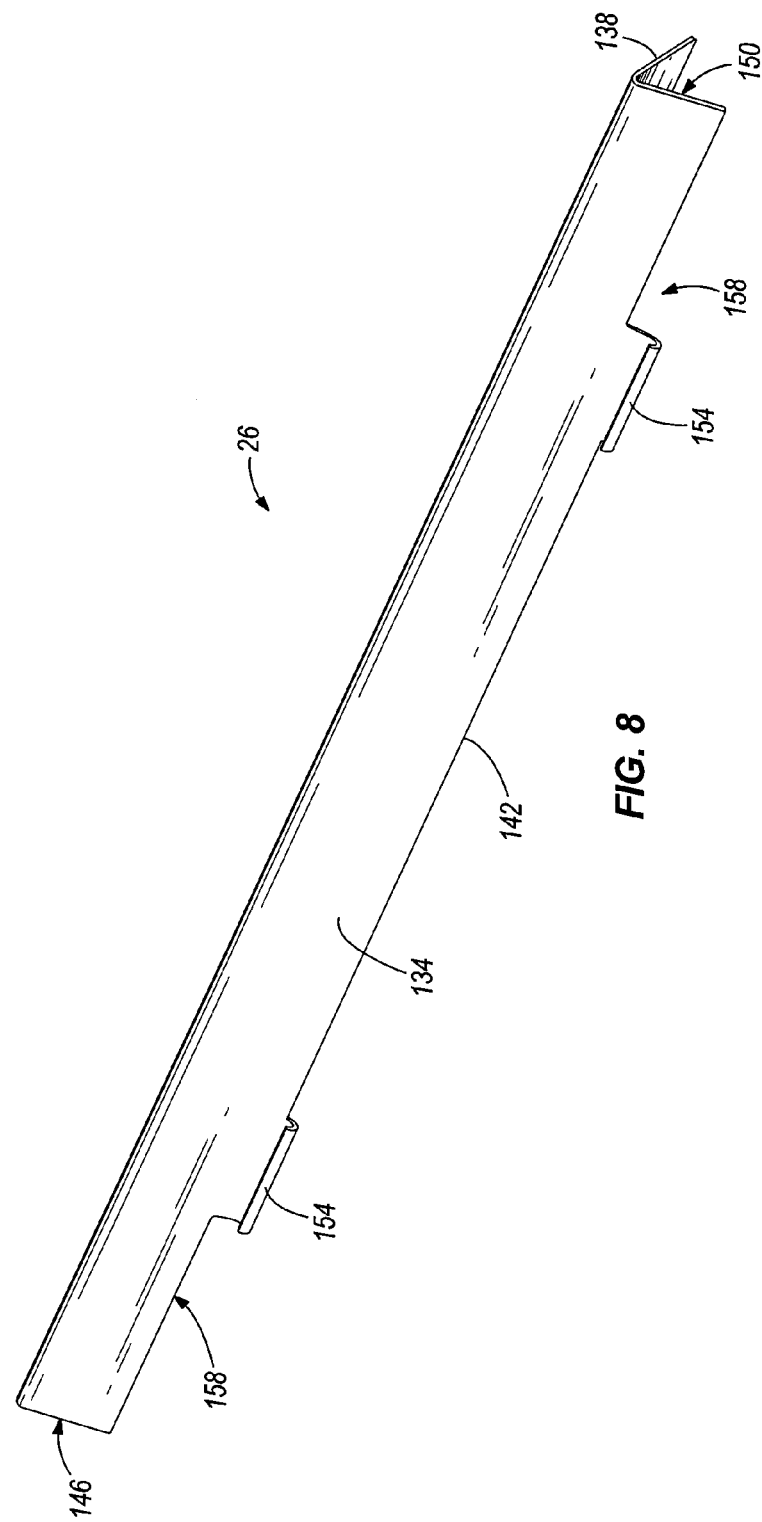

US 7,971,943 B2

FOOD DISPLAY WITH SHELVING SYSTEM

BACKGROUND

The present invention relates to the field of food displays, and particularly to a shelving system for a point-of-purchase food display.

Point-of-purchase food displays commonly include a container having transparent side walls that facilitate viewing the food product by a customer. The container can be opened to facilitate insertion and removal of the food product. In general, racks or shelves are positioned within the container to further assist viewing of the food product. Such displays also commonly include a light for illuminating the food product, a heater for heating the air in the container, and a fan for circulating the heated air. These electrical components are typically positioned above the container and are covered by a hood for aesthetic reasons.

These food displays can also include adjustable racks or shelves that may be positioned in different positions within the container. For example, such shelves frequently are designed to be tilted so that the front of the shelf can be positioned lower than the rear of the shelf to facilitate improved viewing of the food product on the shelf.

SUMMARY

The present invention provides a food storage device comprising a housing defining a volume for storing a food product, a shelf positioned at least partially within the volume and adapted to support a food product, and a coupling assembly coupling the shelf to the housing and adjustable (e.g., infinitely) to position the shelf in one of a plurality of different angles relative to the housing. Preferably, the housing comprises a frame creating a surface coupled to the magnetic assembly, and a translucent panel coupled to the frame to facilitate viewing food product positioned in the housing.

In one embodiment, the coupling assembly comprises a magnetic assembly including a magnet secured to the shelf and magnetically coupled to the housing. Preferably, the magnetic assembly further comprises a magnet holder secured to the shelf, wherein the magnet is secured to (e.g., positioned in) the holder. In this embodiment, the magnet can be secured to the magnet holder by an intermediate material (e.g., a plastic) positioned between the magnet and the magnet holder.

The coupling assembly preferably includes a bracket that is positioned in an opening in the shelf. For example, the bracket can include an upper protrusion that engages an upper surface of the shelf and a lower protrusion that engages a lower surface of the shelf.

Other aspects of the invention will become apparent by consideration of the detailed description and accompanying drawings.

BRIEF DESCRIPTION OF THE DRAWINGS

FIG. 8 is a perspective view of the food retaining device.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
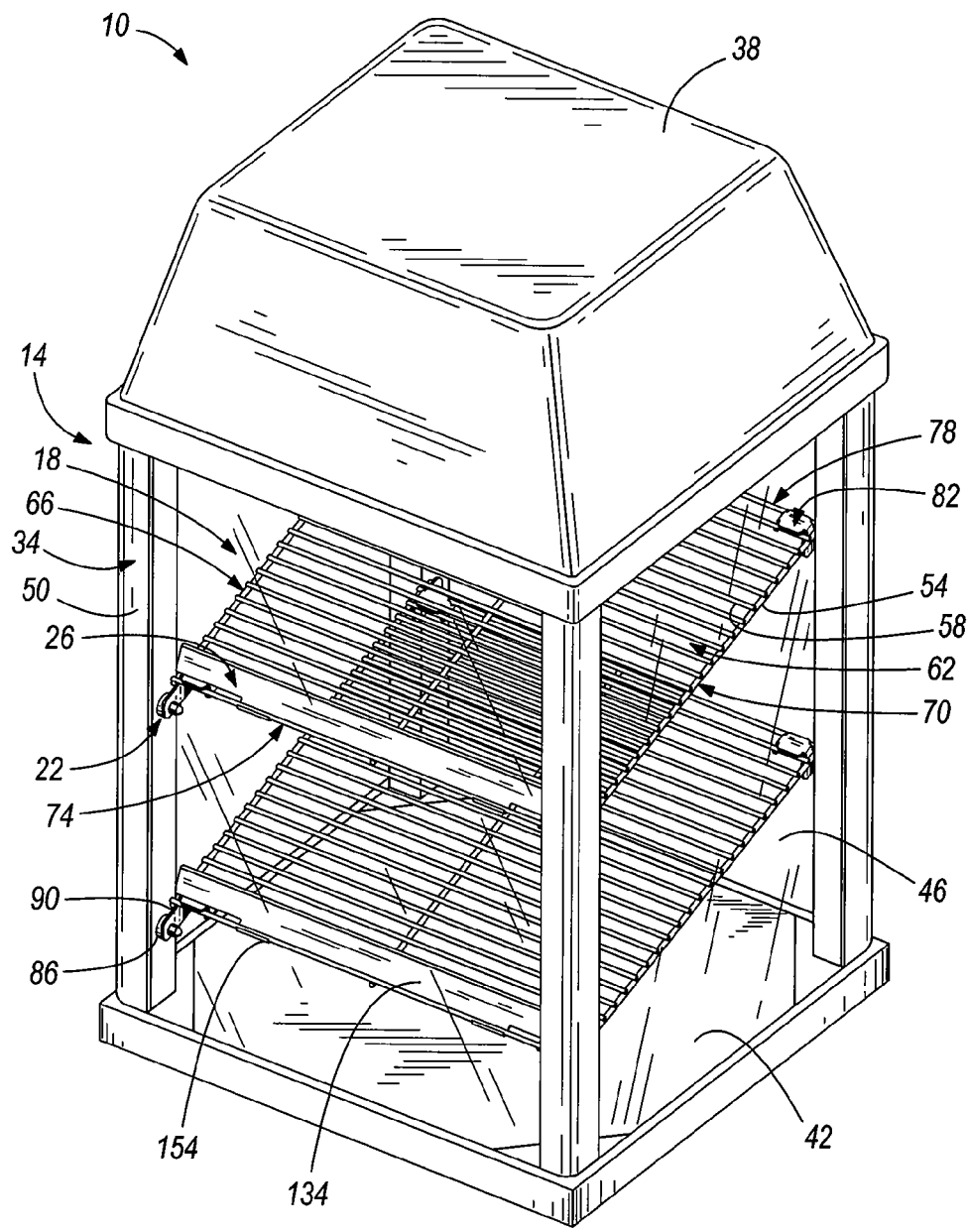
FIG. 1 is a perspective view of a food storage device embodying the present invention.

FIG. 1 shows a food storage device in the form of a heated food display 10. The heated food display 10 includes a housing 14, a shelf 18 positioned in the housing 14, a magnetic assembly 22 that couples the shelf 18 to the housing 14, and a food retaining device 26 coupled to the shelf 18. The heated food display 10 is illustrated with two shelves 18, although more than two shelves 18 or less than two shelves 18 can be used.

The housing 14 includes a frame 34, a roof 38, a floor 42, and translucent panels 46 coupled to the frame 34. The illustrated frame 34 is generally square-shaped and includes four vertical posts 50 at the corners that connect the roof 38 and the floor 42. The four vertical posts 50 are constructed from a magnetically conductive material, such as steel. In other constructions, the posts 50 may be made of some other magnetically conductive material, a magnetic material, or may be coated with a protective finish or coating. In addition, other constructions may remove the roof 38 and the floor 42. Furthermore, the frame 34 may include more than four posts 50 or less than four posts 50.

The illustrated roof 38 includes lights (not shown) and a heating system (not shown). The lights may be turned on or off to better display a food product (not shown). The heating system circulates hot air through the heated food display 10 to maintain the temperature of the heated food product displayed on the shelves 18. In other constructions, the heater may be in the floor 42. In addition, the roof 38 may include a lighted sign or other display that indicates the contents of the heated food display 10. The roof 38 is constructed of a molded plastic, although other constructions may use sheet metal or other materials. In still another construction, the food storage device is a cooled food display, wherein the roof 38 or floor 42 may contain a cooling unit to maintain a cool temperature within the housing 14.

The illustrated floor 42 provides a base for the heated food display 10 and includes four feet (not shown) that the heated food display 10 rests on. One or more of the feet act as levelers to ensure the heated food display 10 is level and solidly positioned on a counter top (not shown) or other surface.

The illustrated translucent panels 46 are supported by the frame 34 and cooperate with the frame 34, the floor 42, and the roof 38 to define the inside of the heated food display 10. One or more of the translucent panels 46 is movable (e.g., hinged) with respect to the frame 34 such that the translucent panel 46 provides access to the inside of the housing 14. In other constructions, the housing 14 may include more than four translucent panels 46 or less than four translucent panels 46. For example, one or more of the translucent panels 46 may be replaced with a mirror surface. In addition, the housing 14 may be different shapes and the proportions may be different than those illustrated.

Figure 2:
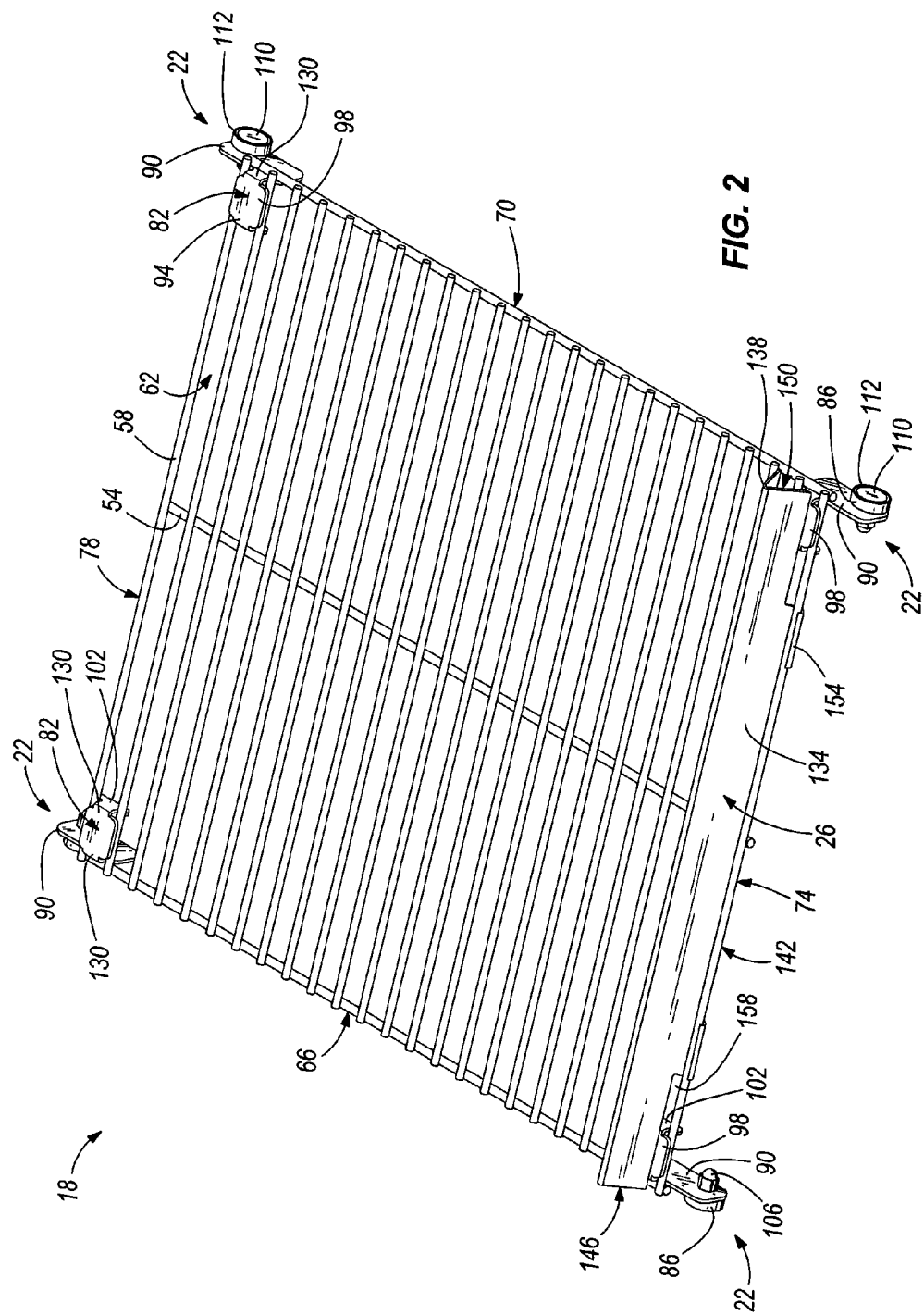
FIG. 2 is a perspective view of a shelf of the food storage device of FIG. 1.

Referring to FIG. 2, the illustrated shelf 18 is constructed from welded metallic rods that are arranged to form a rectangular surface that supports food products inside the housing 14. The plurality of metallic rods includes support members 54 and surface members 58 that are spaced a distance apart from each other to define spaces 62 such that air may circulate within the housing 14 through the shelves 18. The shelf 18 defines a first side 66, a second side 70, a shelf front 74, and a shelf back 78. In other constructions, the shelves 18 may be formed as a single piece, or may be constructed from different materials, such as a plastic. In addition, the shelves 18 may be a different shape, have larger or smaller spaces 62, or may be formed as a solid surface.

In the illustrated construction, four magnetic assemblies 22 are provided to support each shelf 18. Referring to FIGS. 3-6, each illustrated magnetic assembly 22 includes a bracket 82 and a magnet holder 86. The bracket 82 includes an arm 90 and an upper portion 94. The illustrated arm 90 and upper portion 94 are formed as a single piece and are oriented at 90 degrees with respect to each other. The 90 degree relation acts as a leveling mechanism for the shelf 18 such that the shelf 18 is level with respect to the first side 66 and the second side 70.

Figure 3:
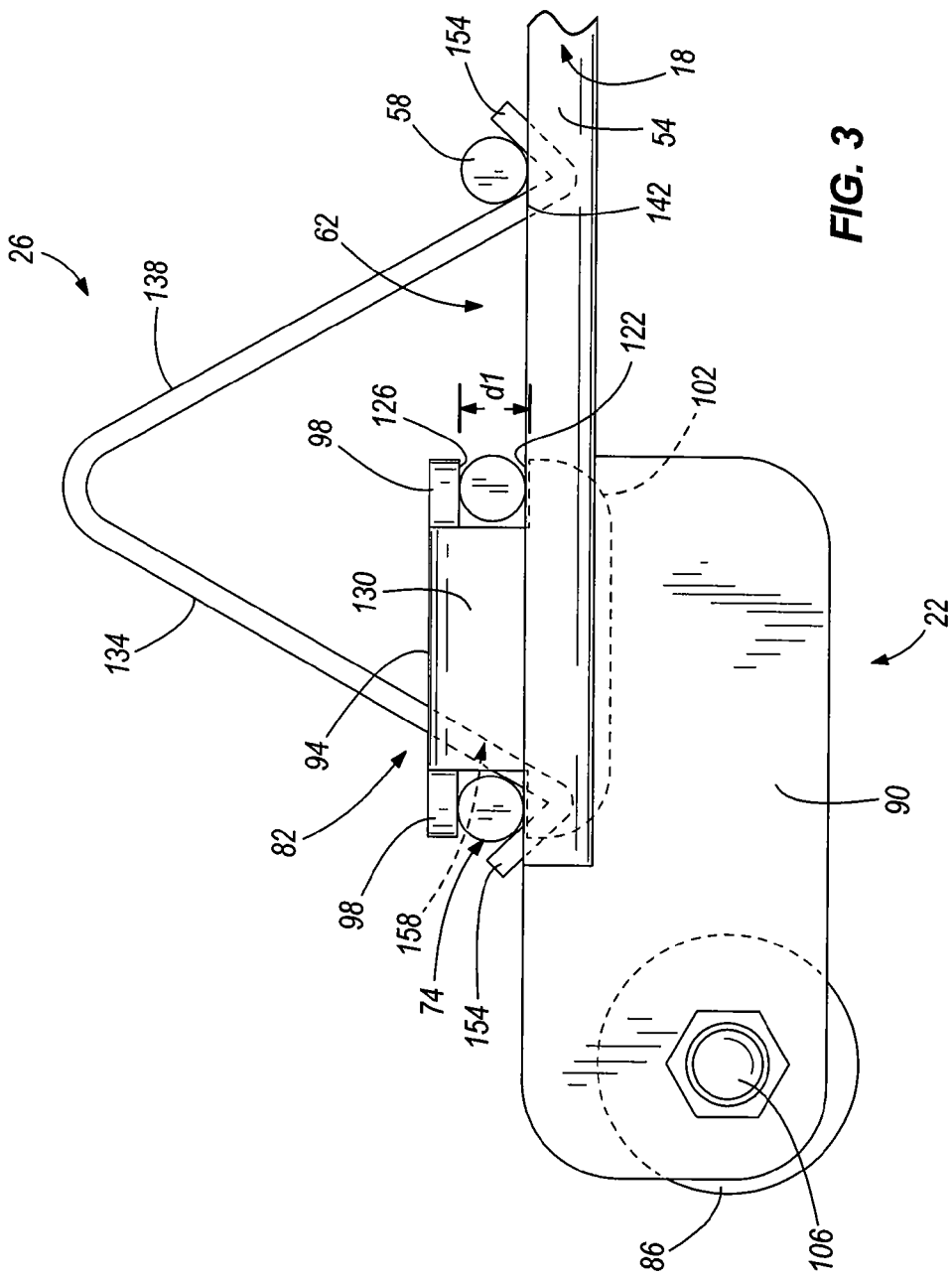
FIG. 3 is an enlarged partial side view of the shelf of FIG. 2.

As shown in FIG. 3, the upper portion 94 includes two upper protrusions 98 that engage the top of the surface members 58, and four lower protrusions 102 that engage the bottom of the surface members 58 such that the bracket 82 is secured between the surface members 58. In other constructions, the magnetic assembly 22 may be formed as multiple pieces and may attach to the shelf 18 in different ways or may be formed as part of the shelf 18. In addition, the magnet holder 86 and the bracket 82 may be formed as a single piece.

Figure 5:
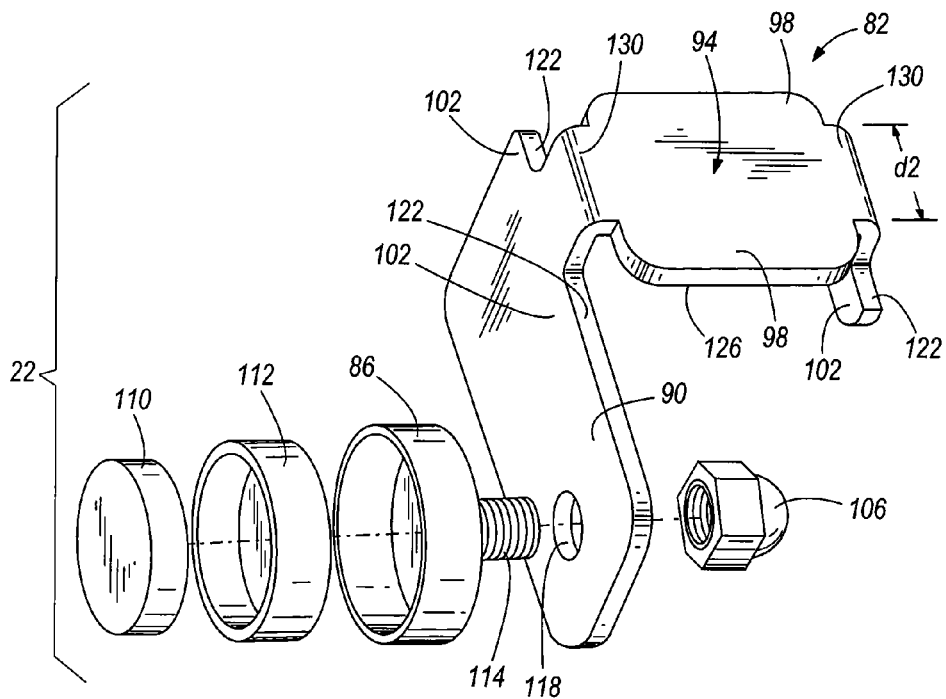
FIG. 5 is an exploded perspective view of the magnetic assembly of FIG. 4.

Turning now to FIG. 5, the illustrated magnet holder 86 is attached to the arm 90 and secured with a first fastener 106. A magnet 110 is held in the magnet holder 86 by an intermediate material 112. In the illustrated construction, the intermediate material 112 is a plastic with thermal properties to match or exceed the maximum temperatures within the heated food display 10. In other constructions the intermediate material 112 may be a glue, a rubber, an epoxy, or another material.

FIG. 5 illustrates the magnetic assembly 22 in an exploded state wherein the intermediate material 112 is visible that secures the magnet 110 in the magnet holder 86. The magnet holder 86 includes a second fastener 114 such as a threaded stud which is inserted through an aperture 118 in the arm 90 and fastened with the first fastener 106 such as an acorn nut. In addition, the second fastener 114 and the first fastener 106 may be different fasteners as is known by those skilled in the art.

Each magnetic assembly 22 engages the surface members 58 to secure the magnetic assembly 22 to the shelf 18. Each magnetic assembly 22 is operable to magnetically couple the shelf 18 to one of the posts 50 of the housing 14, thereby positioning the shelf 18 with respect to the housing 14. In this way, the shelf 18 may be positioned inside the housing 14 at a number of angles with respect to the floor 42. In other constructions, more than four magnetic assemblies 22 or less than four magnetic assemblies 22 may be secured to each shelf 18.

Figure 4:
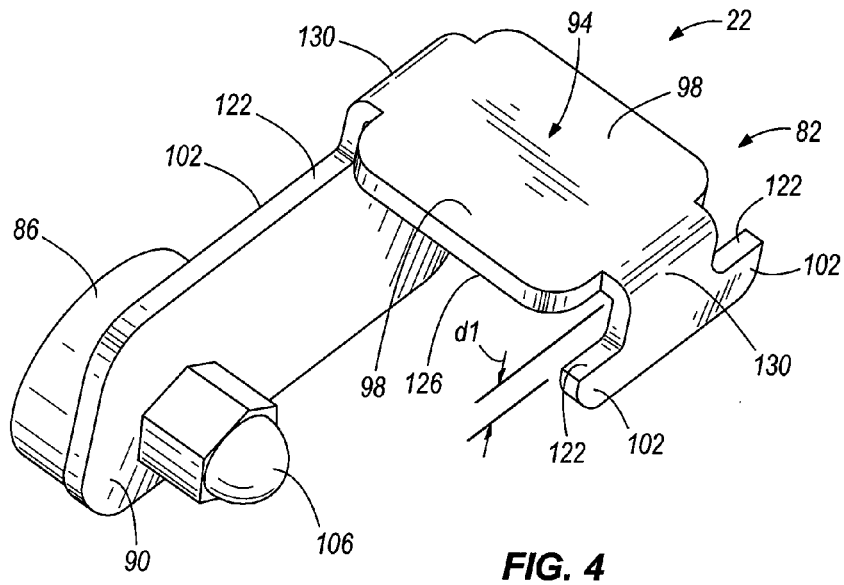
FIG. 4 is a perspective view of a magnetic assembly.

FIGS. 3 and 4 illustrate a distance d1 that is defined as the vertical distance between a top surface 122 of the lower protrusion 102 and a bottom surface 126 of the upper protrusion 98. The distance d1 is slightly larger than the diameter of the surface members 58 such that when the surface members 58 are engaged with the bracket 82 the magnetic assembly 22 is secured to the shelf 18 and inadvertent disengagement is inhibited. In other constructions, the distance d1 may be equal to the diameter of the surface members 58 or slightly less than the diameter of the surface members 58.

Figure 6:
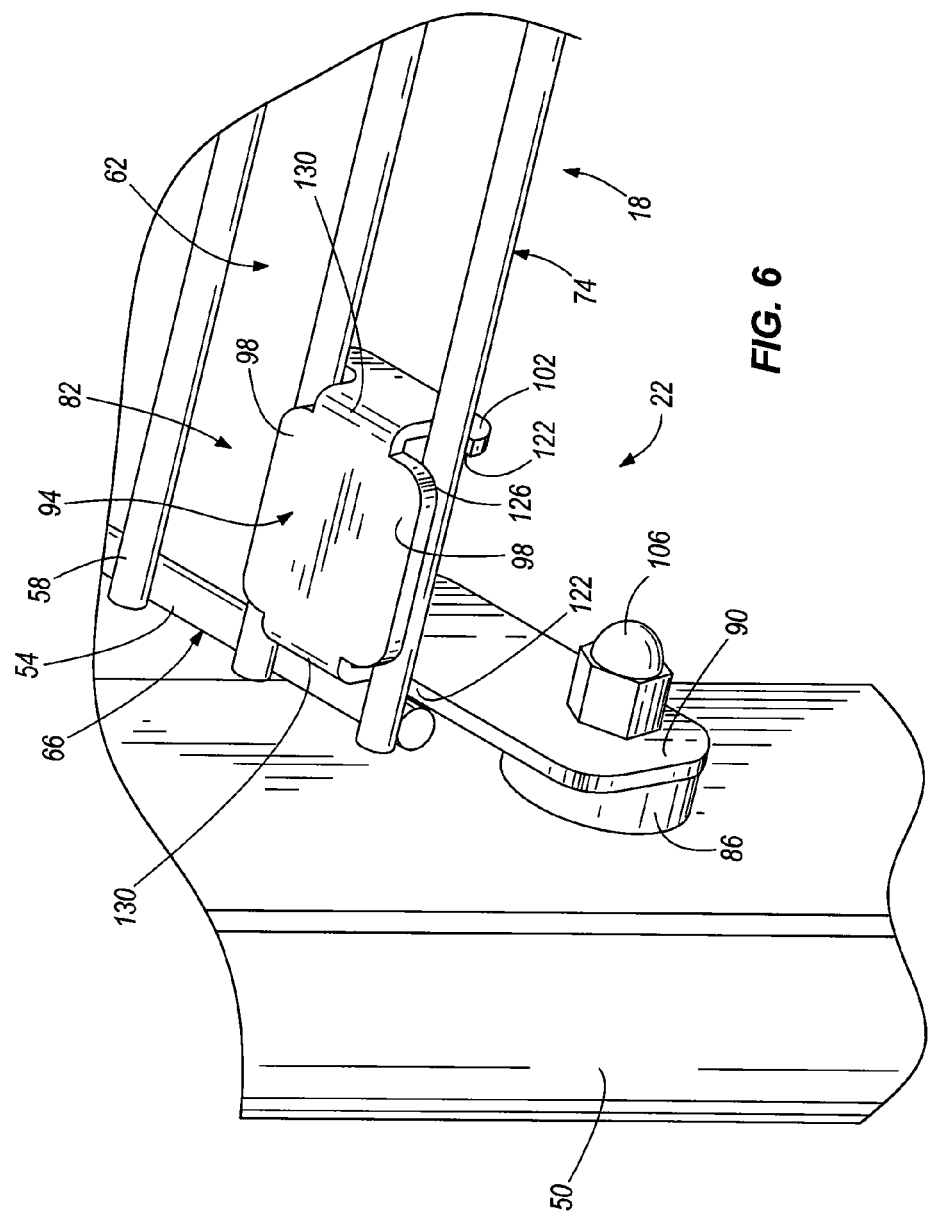
FIG. 6 is an enlarged partial perspective view of the shelf of FIG. 1 with a food retaining device removed.

Referring to FIG. 5, a width d2 of a stabilizing portion 130 is sized to fit between two adjacent surface members 58 (see FIG. 6). In the illustrated construction, the width d2 is slightly smaller than the distance between the two adjacent surface members 58. In other constructions, the width d2 may be larger than the distance between the two adjacent surface members 58 or substantially equal to the distance between the two adjacent surface members 58.

In operation of the illustrated construction, the magnetic assemblies 22 are secured to the shelves 18 by positioning the bracket 82, while disengaged, below the shelf 18 between two adjacent surface members 58 at the midpoint of the space 62 defined by the adjacent surface members 58 and spaced from the sides 66,70. The surface members 58 are then elastically deformed such that the space 62 is enlarged to the point where the upper portion 94 of the bracket 82 may be moved through the space 62. When bracket 82 is positioned with the upper portion 94 positioned as shown in FIG. 6, the surface members 58 are released and return to the original position wherein the upper protrusions 98 may not move through the space 62 and the upper protrusions 98 engage the top of the surface members 58 and the lower protrusions 102 engage the bottom of the surface members 58 such that the magnetic assembly 22 is secured to the shelf 18.

Figure 7:
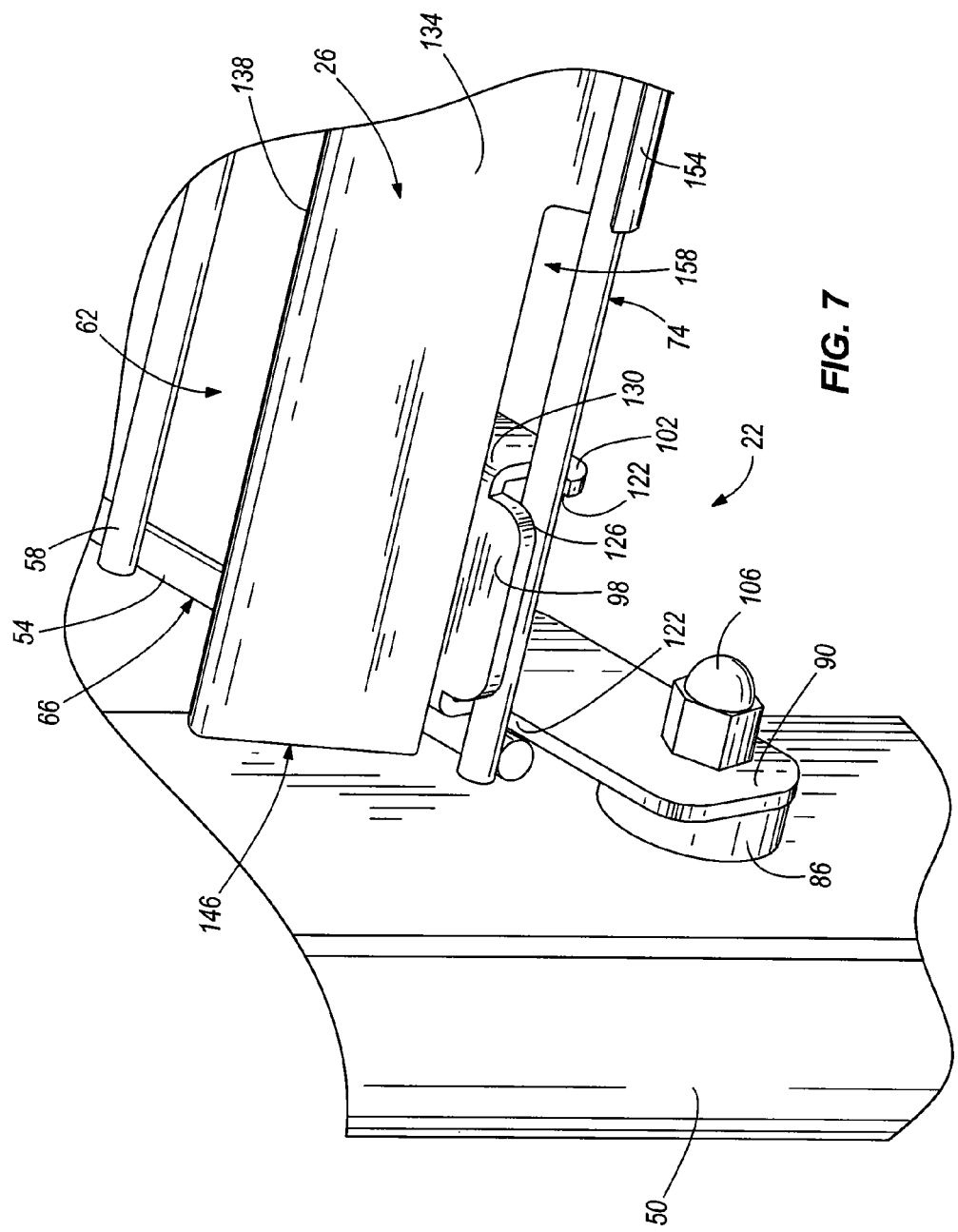
FIG. 7 is the same view as FIG. 6 with the food retaining device added.

When the magnetic assemblies 22 are secured to the shelf 18 and still spaced from the sides 66,70, the shelf 18 can be positioned within the housing 14. After the shelf 18 is satisfactorily placed, the magnetic assemblies 22 are slid toward the corresponding side 66,70 into the positions shown in FIGS. 2 and 6. The magnetic assemblies 22 are positioned along the posts 50 to couple the shelf 18 to the posts 50 of the housing 14 and hold it in a position with respect to the floor 42 such that the shelf 18 and posts 50 are arranged as shown in FIG. 7. This arrangement allows the positioning of the shelf at an infinitely variable range of angles while holding the shelf 18 level with respect to the first side 66 and the second side 70.

Referring to FIGS. 2 and 8, the illustrated food retaining device 26 is removably coupled to each shelf 18. The illustrated food retaining device 26 is formed as a single piece and includes a front side 134, a back side 138, a bottom edge 142, a first end 146, a second end 150, and two tabs 154 attached to each of the front side 134 and the back side 138 (see FIG. 8).

The first end 146 extends to the first side 66 of the shelf 18 and the second end 150 extends to the second side 70 of the shelf 18 such that the food retaining device 26 extends substantially between the first side 66 and the second side 70. The food retaining device 26 inhibits food products from inadvertently falling off the shelf 18. The food retaining device 26 may be removed from the shelf 18 by flexing the food retaining device 26 so the tabs 154 disengage the surface members 58. In some situations, it is conceivable that removing the food retaining device 26 may be desirable. The food retaining device 26 may be formed from multiple pieces or may be constructed from a screen like material.

As is best seen in FIG. 3, the food retaining device 26 is positioned near the shelf front 74 and is secured to the shelf 18 by positioning the tabs 154 to engage the surface members 58 of the shelf 18 while the bottom edge 142 of the back side 138 is positioned on the support members 54 of the shelf 18. The food retaining device 26 also defines cutouts 158 on the front side 134 that extend from the first end 146 to the tab 134 closest to the first end 146, and from the second end 150 to the tab 134 closest to the second end 150. The cutouts 158 are sized to provide clearance for the magnetic assemblies 22. In other constructions, the cutouts 158 may be different sizes or shapes.

Once the magnetic assemblies 22 are positioned as shown in FIG. 2, the food retaining device 26 can be engaged with the shelf 18. The food retaining device 26 is elastically deformed such that the tabs 154 fit in the space 62 defined between the surface members 58. When in the position shown in FIGS. 2 and 3, the food retaining device 26 is released and returns to the original state and the tabs 154 engage the surface members 58 to attach the food retaining device 26 to the shelf 18. Only one food retaining device 26 is preferred as the shelf 18 is substantially level with respect to the first side 66 and the second side 70 such that food product is inhibited from rolling side to side and falling from the shelf 18 off either the first side 66 or the second side 70. In other constructions, the food retaining device 26 may be placed at different positions between the shelf front 74 and the shelf back 78. In addition, more than one food retaining device 26 is conceivable.

Various features and advantages of the invention are set forth in the following claims.

What is claimed is:

1. A food storage device comprising:
    a housing defining a volume for storing a food product and including a frame having four posts, each with a front surface facing a front of the housing and a side surface perpendicular to the front surface, the housing further including translucent panels coupled to the frame to facilitate viewing the food product positioned in the housing;
    a shelf positioned at least partially within the volume and adapted to support the food product, the shelf having a front edge lower than a rear edge such that the shelf is tilted toward the front of the housing; and
    four magnetic assemblies coupling the shelf to the side surfaces of the four posts, the magnetic assemblies adjustable to position the shelf in one of a plurality of different angles relative to the housing,
    wherein each magnetic assembly comprises a magnet secured to the shelf and magnetically coupled to the housing,
    wherein each magnetic assembly further comprises a magnet holder secured to the shelf, wherein the magnet is secured to the holder,
    wherein each magnetic assembly further comprises an intermediate material positioned between the holder and the magnet, and
    wherein the shelf includes surface members and openings between the surface members, and wherein each magnetic assembly includes a bracket positioned in one of the openings between two surface members, each bracket engaging the two corresponding surface members to maintain the magnetic assembly in position.

2. A food storage device as claimed in claim 1, wherein each magnetic assembly comprises a magnet secured to the shelf and magnetically coupled to the frame.

3. A food storage device as claimed in claim 1, wherein the intermediate material comprises plastic.

4. A food storage device as claimed in claim 1, wherein each bracket includes an upper protrusion that engages an upper surface of each surface member and a lower protrusion that engages a lower surface of each surface member.

5. A food storage device comprising:
    a housing defining a volume for storing a food product, the housing including a frame with four vertical posts and a translucent panel coupled to the frame to facilitate viewing the food product positioned in the housing, each vertical post defining a post width less than the overall width of the housing;
    a shelf positioned at least partially within the volume and adapted to support the food product; and
    a coupling assembly including four magnets magnetically coupling the shelf to the housing, the coupling assembly facilitating the positioning of the shelf in an infinitely variable number of inclined positions relative to the housing,
    wherein each magnet defines a magnet width that is less than the post width,
    wherein each vertical post provides a surface and each magnet magnetically couples to a corresponding surface,
    wherein the coupling assembly further comprises four magnet holders secured to the shelf, wherein the magnets are secured to the holders,
    wherein the coupling assembly further comprises an intermediate material positioned between each holder and magnet,
    wherein the intermediate material comprises plastic, and
    wherein the shelf includes surface members and openings between the surface members, and wherein each coupling assembly includes a bracket positioned in one of the openings between two surface members, each bracket engaging the two corresponding surface members to maintain the coupling assembly in position.

6. A food storage device as claimed in claim 5, wherein each magnet is secured to the shelf and magnetically coupled to the frame.

7. A food storage device as claimed in claim 5, wherein each bracket includes an upper protrusion that engages an upper surface of each surface member and a lower protrusion that engages a lower surface of each surface member.

8. A food storage device comprising:
    a housing defining a width and a volume for storing a food product, and including vertical posts each having a width substantially less than the width of the housing, the housing further including a translucent panel coupled to the vertical posts to facilitate viewing the food product positioned in the housing;
    a shelf positioned at least partially within the volume and adapted to support a food product, the shelf including surface members and openings between the surface members; and
    magnetic assemblies coupling the shelf to the housing and adjustable to position the shelf in one of a plurality of different angles relative to the housing, each magnetic assembly coupling the shelf to a corresponding vertical post, each magnetic assembly including,
    a magnet holder secured to the shelf,
    a magnet secured to the shelf and to the magnet holder, the magnet magnetically coupled to the housing,
    an intermediate material positioned between the magnet holder and the magnet, wherein the intermediate material comprises plastic, and
    a bracket positioned in one of the openings between two surface members, the bracket engaging the two corresponding surface members to maintain the magnetic assembly in position, the bracket including an upper protrusion that engages an upper surface of the shelf and a lower protrusion that engages a lower surface of the shelf.

* * * * *